United States Patent

Smith

[15] 3,653,724
[45] Apr. 4, 1972

[54] SAFETY BRAKE SYSTEM

[72] Inventor: William Van Smith, 1617 Duke Road, Memphis, Tenn. 38108

[22] Filed: Dec. 18, 1970

[21] Appl. No.: 99,532

Related U.S. Application Data

[63] Continuation-in-part of Ser. No. 17,812, June 23, 1969.

[52] U.S. Cl. ............................................................303/19
[51] Int. Cl. ............................................................B60t 7/14
[58] Field of Search ......................................303/18, 19

[56] References Cited

UNITED STATES PATENTS 3,137,369   6/1964   Stromberg ..........................303/18 X

*Primary Examiner*—Edward A. Sroka
*Assistant Examiner*—H. S. Lane
*Attorney*—John R. Walker, III

[57] ABSTRACT

A safety brake system for a vehicle, which automatically applies the brakes when the driver of the vehicle leaves his seat. The system includes an accumulator for accumulating a quantity of fluid under pressure from the master cylinder assembly of the vehicle when the brake pedal of the vehicle is applied. A valve is actuated when the driver leaves his seat to cause the accumulated fluid to flow to the brakes and apply same.

7 Claims, 3 Drawing Figures

PATENTED APR 4 1972

3,653,724

INVENTOR.
WILLIAM VAN SMITH
BY John R. Walker, III
Attorney and from the accumulator when in a second position, and actuating means in the form of a cushion means for moving the valve means selectively into said first and second positions. The accumulator includes a cylinder, a piston slidably mounted in the cylinder and defining a chamber on one side of the piston with the piston being movable in a first direction to increase the size of the chamber and movable in the second and opposite direction from the first direction to decrease the size of the chamber, and spring means urging the piston towards said second direction. The actuating means for moving the valve comprises a diaphragm means including a diaphragm chamber and a movable diaphragm member, a plunger attached to the diaphragm member and the valve means, and spring means urging the diaphragm and the plunger in the direction to move the valve means into the above-mentioned second position. Cushion means including a cavity therein for providing air under pressure when the driver of the vehicle is sitting thereon, and a line communicating the cavity with the diaphragm chamber whereby the air under pressure flows to the diaphragm chamber to move the diaphragm and the plunger in a direction to move the valve means into said first position.

SAFETY BRAKE SYSTEM

CROSS REFERENCE TO RELATED APPLICATION

This is a continuation-in-part of my co-pending application, Ser. No. 17,812, filed June 23, 1969, entitled "Safety Brake System."

BACKGROUND OF THE INVENTION

1. Field of the Invention

This invention relates to safety brake systems for vehicles.

2. Description of the Prior Art

Applicant has knowledge of the following U.S. Pat. Nos. 1,956,978; 2,044,944; 2,750,010; 2,918,145; 3,259,203; 3,280,933; 3,332,522; 3,360,305; 3,451,051; and 3,487,451.

The U.S. Pat. No. 1,956,978 shows a device for controlling the ignition circuit of a vehicle engine which has a delayed action for stopping the engine of a vehicle if the driver leaves his seat.

The U.S. Pat. No. 2,044,944 is used in conjunction with vacuum and causes the brakes of the vehicle to be applied when the driver leaves his seat.

The U.S. Pat. No. 2,750,010 has a mechanically actuated device which automatically operates to apply the brakes when the operator of the car leaves his seat.

The U.S. Pat. No. 2,918,145 discloses a brake band which is mechanically actuated whenever the operator leaves his seat.

The U.S. Pat. No. 3,259,203 discloses a seat actuated vehicle brake mechanism which utilizes spring means to actuate the brake.

U.S. Pat. No. 3,280,933 discloses a brake assembly which is spring set in the absence of an operator on the seat, and the weight of the operator on the seat overcomes the spring force which tends to engage the brake assembly, resulting in brake release. U.S. Pat. No. 3,332,522 shows a vehicle operator seat brake control system wherein there is provided a hydraulic motor which is spring-biased to apply the vehicle parking brake and when supplied with pressurized fluid releases the vehicle parking brake.

U.S. Pat. No. 3,360,305 discloses a dead man seat brake which includes a tension spring that causes the seat to be moved upwardly and a lever to be pivoted to cause a hydraulic actuator to expel fluid and cause the brakes to be applied.

The U.S. Pat. No. 3,451,051 shows a fluid level indicator for master brake cylinders.

The U.S. Pat. No. 3,487,451 discloses a brake control system for operating the brakes of a vehicle in response to actuation of an electrical pressure switch in the driver's seat of the vehicle, which in turn controls a magnetic valve that causes the brakes to be applied by air, hydraulic fluid, vacuum or the like.

SUMMARY OF THE INVENTION

The present invention is directed towards providing an improved and effective safety brake system for a vehicle which automatically applies the brakes when the driver leaves his seat. It is a concept of the present invention to provide an accumulator for accumulating a quantity of fluid under pressure from the master cylinder assembly of the vehicle when the brake pedal is applied and by means of a valve which is actuated by the driver leaving his seat, the fluid from the accumulator is caused to flow to the brakes for the actuation thereof. It is a further concept to provide means for disabling the device of the present invention if it is desired not to use the system, as for example, if the vehicle is in tow. Additionally, adjustment means are provided to allow the operator of the vehicle to set the desired braking power.

The device of the present invention is relatively simple in construction, yet highly effective, and can easily be installed by interposing the device in the hydraulic line of the existing braking system.

The present invention includes an accumulator, valve means for selectively directing flow to the brakes of the vehicle from the master cylinder assembly when in a first position

DESCRIPTION OF THE PREFERRED EMBODIMENT

Figures 1, 2, 3:
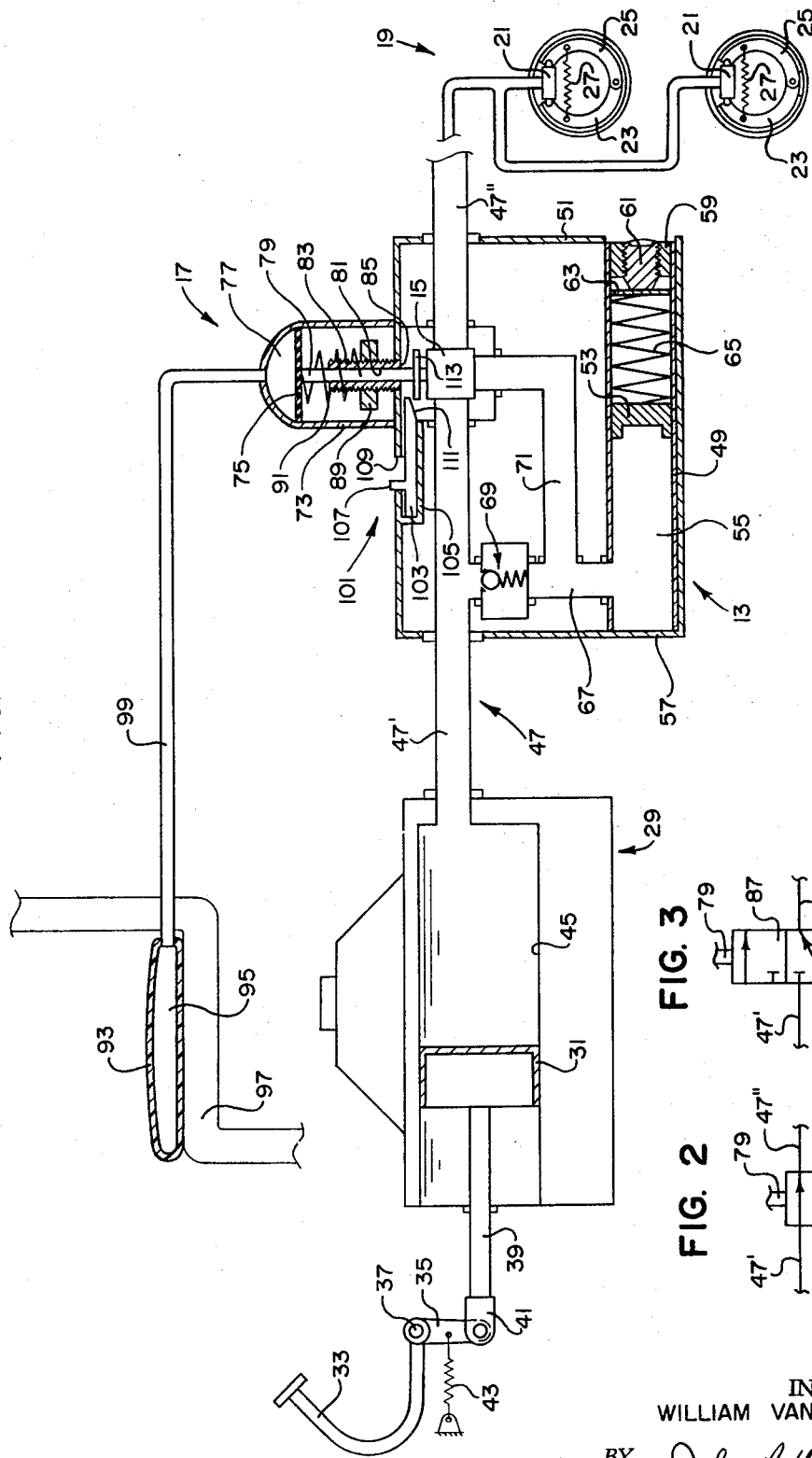
FIG. 1 is a partially sectionalized and somewhat schematic view of the safety brake system of the present invention.
FIG. 2 is a schematic view showing the valve of the system in a first position.
FIG. 3 is a view similar to FIG. 2 showing the valve in a second position.

The safety brake system 11 of the present invention comprises in general an accumulator 13, a valve 15, and an actuator assembly 17 for actuating valve 15.

System 11 is adapted to be utilized in a vehicle of the type having hydraulically actuated brakes, as for example, like the typical brakes 19, each of which include the usual hydraulic ram 21, brake shoes 23, 25 and back-off spring 27. In addition, the usual master cylinder assembly 29 is provided that includes a piston 31. The usual brake pedal 33 having a depending lever 35 fixedly attached thereto is pivotally mounted beneath the floorboard of the vehicle, not shown, for pivot about a horizontal axis as at 37. The lower end of lever 35 is mounted in the usual manner to the piston rod 39 of master cylinder piston 31 as by the coupler 41. The usual spring 43 is attached to lever 35 and urges the brake pedal 33 upwardly. Thus, it will be understood that downward displacement of the brake pedal 33 provides hydraulic fluid under pressure in the chamber 45 of master cylinder assembly 29.

Valve 15 is interposed in the usual conduit 47, which extends from master cylinder assembly 29 to rams 21 to divide the conduit 47 into a first portion or conduit 47' extending between chamber 45 and valve 15 and a second portion or conduit 47" which extends from valve 15 to rams 21, it being understood that second conduit 47" is divided to flow to the separate rams 21.

Accumulator 13 includes a cylinder 49 which is preferably disposed within a housing 51 that also encloses valve 15 and some of the other components of system 11. In addition, accumulator 13 includes a piston 53 slidably mounted in cylinder 49 to define an accumulator chamber 55 in cylinder 49 on one side of piston 53, that is, that side of the piston to the left as viewed in FIG. 1. Piston 53 is movable in a first direction (to the right as viewed in FIG. 1) to increase the size of accumulator chamber 55 and is movable in a second and opposite direction (to the left as viewed in FIG. 1) from said first direction to decrease the size of accumulator chamber 55. Cylinder 49 is blocked off at its ends. Thus, on one end the cylinder is blocked off by suitable means as a portion of the housing 51 as at 57. The opposite end has an internally threaded sleevelike member 59 which is fixedly received in the cylinder 49 and has an externally threaded plug 61 received therein which bears against a spring seat 63. A compression spring 65 extends between spring seat 63 and piston 53 to urge piston 53 in said heretofore-mentioned second direction (to the left as viewed in FIG. 1).

A third conduit 67 extends between accumulator chamber 55 and first conduit 47'. A check valve 69 is interposed in third conduit 67 to permit flow from conduit 47' to accumulator chamber 55 through third conduit 67 but to prevent flow in the opposite direction from accumulator chamber 55 to first conduit 47'. A fourth conduit 71 is communicated at one end with accumulator chamber 55 preferably through third conduit 67 and is communicated at the opposite end with valve 15. The connections of conduit 71 and conduits 47' and 47'' with valve 15 are best seen in FIGS. 2 and 3 wherein the valve 15 is shown schematically. It will be seen from FIG. 2 that when the valve 15 is in said heretofore-mentioned first position, first conduit 47' is connected with second conduit 47'' through valve 15, and flow through valve 15 from fourth conduit 71 is blocked. From FIG. 3 it will be seen that when valve 15 is in said heretofore-mentioned second position, flow is interrupted between first conduit 47' and second conduit 47'', and fourth conduit 71 is connected to second conduit 47'' through valve 15.

Actuator assembly 17 includes a housing 73 removably mounted on housing 51, a flexible and movable diaphragm 75 is mounted around the edges thereof in housing 73 to define a diaphragm chamber 77 in the upper portion of housing 73 above diaphragm 75. A plunger 79 is fixedly attached at the upper end thereof to the underside of diaphragm 75 and extends slidably downwardly through the bore 81 in an externally threaded stud 83 that is fixedly attached in an opening 85 in housing 51. The lower end of plunger 79 is fixedly attached to the movable portion 87 of valve 15. A spring seat in the form of a nut 89 is threadedly engaged on stud 83. A compression spring 91 extends between spring seat 89 and the bottom side of diaphragm 75 to urge diaphragm 75 and plunger 79 upwardly in a direction to urge valve 15 toward said second position. Actuator assembly 17 additionally includes a flexible and resilient hollow cushion 93 having a cavity 95 therein. Cushion 93 is suitably placed on the set 97 of the vehicle, not shown, so that when the driver thereof is pressing thereagainst when seated, air under pressure is provided in cavity 95. It will be understood that, if desired, the cushion 93 may be placed on the forward surface of the back of seat 97 without departing from the spirit and scope of the present invention, in which case it will be understood that the pressure of the driver's back against the cushion 93 will cause the heretoforementioned air under pressure in cavity 95. A line 99 communicates cavity 95 with diaphragm chamber 77 whereby when the driver is in seat 97, the air under pressure flows to diaphragm chamber 77 to move valve 15 into said first position.

An assembly 101 is provided for releasably holding plunger 79 to releasably hold valve 15 in said first position. Assembly 101 preferably includes a member 103 slidably mounted from housing 51 as by means of the bracket 105. Member 103 has a handle 107 attached thereto and extending upwardly therefrom through a slot 109 in housing 51. The inner end of member 103 is tapered as at 111 and adapted to engage a flange 113 when the member 103 is moved to the right from the position shown in FIG. 1. When moved to the right by means of the handle 107, the tapered portion 111 engages the flange 113 and wedges it downwardly to hold valve 15 in said first position to effectively inactivate system 11 so that the brakes 19 operate in the normal manner. It will be understood that when it is desired to activate system 11 to its normal operating condition, the member 103 is moved to the left, as shown in FIG. 1.

In describing the operation of the system 11 and assuming that the member 103 is in the position shown in FIG. 1, and further assuming that the operator is sitting on the cushion 93, the air under pressure in cavity 95 will be transmitted to diaphragm chamber 77 through the conduit 99 and will overcome the pressure of spring 91 so that the mid-portion of the diaphragm 75 moves downwardly to cause valve 15 to move into said first position. It will be understood that the amount of pressure sufficient to overcome the pressure of spring 91 can be adjusted by moving the nut 89 so as to adjust for actuation by any desired pressure or weight against cushion 93. Further, it will be understood that valve 15 will remain in said first position so long as the person remains in the seat 97 and exerts pressure or weight on the cushion 93 sufficient to overcome the spring 91. With valve 15 in said first position and with the operator in the seat 97, the brakes 19 will operate in the usual manner, that is, when brake pedal 33 is depressed, piston 31 will move to the right and cause fluid flow through conduit 47 to actuate the rams 21 and cause the brakes 19 to be applied. It will also be understood that during normal operation of the system 11, the accumulator 13 will become charged, that is, fluid will flow from first conduit 47' through check valve 69, through third conduit 67 and into accumulator chamber 55 to move piston 53 to the right and compress spring 65. Then, subsequently when the driver leaves seat 97, spring 91 will cause diaphragm 75 to move upwardly and move valve 15 into said second position shown in FIG. 3, whereupon spring 65 will move piston 53 to the left or in said second direction to cause fluid to flow through fourth conduit 71 and second conduit 47'' to the rams 21 and apply the brakes.

Spring 65 will keep pressure on rams 21 until valve 15 is moved into said first position by the driver when he is again seated on seat 97. It will be understood that the plug 61 may be turned to increase or decrease the tension on spring 65 so as to set the desired braking power.

Although the invention has been described and illustrated with respect to a preferred embodiment thereof, it is to be understood that it is not to be so limited since changes and modifications may be made therein which are within the full intended scope of this invention.

I claim:

1. A safety brake system for a vehicle of the type having fluid actuated wheel brakes and having a pedal-actuated master-cylinder assembly for providing fluid under pressure when the pedal is displaced, said brake system comprising accumulator means for accumulating a quantity of fluid under pressure from said master cylinder assembly when said pedal is displaced, means including valve means for selectively directing flow to said brakes from said master cylinder assembly when in a first position and from said accumulator means when in a second position, and actuating means for moving said valve means selectively into said first and second positions.

2. The safety brake system of claim 1 in which said accumulator means includes a cylinder, a piston slidably mounted in said cylinder and defining a chamber on one side of said piston and said piston being movable in a first direction to increase the size of said chamber and movable in a second and opposite direction from said first direction to decrease the size of said chamber, and spring means urging said piston in said second direction.

3. The safety brake system of claim 1 in which said actuating means comprises diaphragm means including a diaphragm chamber and a movable diaphragm member, a plunger attached to said diaphragm member adjacent one end thereof and attached to said valve means adjacent the opposite end thereof, spring means urging said diaphragm and said plunger in a direction to move said valve means into said second position, cushion means including a cavity therein for providing air under pressure when the driver of the vehicle is pressing thereagainst, a line communicating said cavity with said diaphragm chamber whereby when the driver of the vehicle is seated, the air under pressure flows to said diaphragm chamber to move said diaphragm and said plunger in a direction to move said valve means into said first position.

4. The safety brake system of claim 3 including means for releasably holding said plunger to releasably hold said valve means in said first position.

5. A safety brake system for a vehicle of the type having fluid-actuated wheel brakes and having a pedal-actuated master-cylinder assembly for providing fluid under pressure when the pedal is displaced, said brake system comprising an accumulator cylinder, a piston slidably mounted in said accumulator cylinder and defining an accumulator chamber on one side of said piston and said piston being movable in a first direction to increase the size of said accumulator chamber and movable in a second and opposite direction from said first direction to decrease the size of said accumulator chamber, spring means urging said piston in said second direction, first conduit means communicated with said master cylinder assembly, a second conduit means communicated with said brakes, a third conduit means extending between said first conduit means and said accumulator chamber for conducting fluid flow from said first conduit means and said master-cylinder to said accumulator chamber to expand the size of said accumulator chamber against the force of said spring means when said pedal is displaced, a fourth conduit means communicated with said accumulator chamber; valve means, connected to said first, second and fourth conduit means, for movement into a first position in which flow is blocked from said fourth conduit means to said second conduit means and is directed from said first conduit means to said second conduit means and into a second position in which flow is blocked from said first conduit means to said second conduit means and fluid is directed from said fourth conduit means to said second conduit means to cause said fluid under pressure from said accumulator chamber to flow to said brakes for the actuation thereof, and actuating means for selectively moving said valve means into said first and second positions.

6. The safety brake system of claim 5 in which said actuating means comprises diaphragm means including a diaphragm chamber and a movable diaphragm member, a plunger attached to said diaphragm member adjacent one end thereof and attached to said valve means adjacent the opposite end thereof, spring means urging said diaphragm and said plunger in a direction to move said valve means into said second position, cushion means including a cavity therein for providing air under pressure when the driver of the vehicle is pressing thereagainst, a line communicating said cavity with said diaphragm chamber whereby when the driver of the vehicle is seated, the air under pressure flows to said diaphragm chamber to move said diaphragm and said plunger in a direction to move said valve means into said first position.

7. The safety brake system of claim 6 including means for releasably holding said plunger to releasably hold said valve means in said first position.

* * * * *